July 23, 1963     D. M. SYPTAK     3,099,001
VOLTAGE COMPARATOR THRESHOLD ALARM CIRCUIT
Filed July 3, 1961
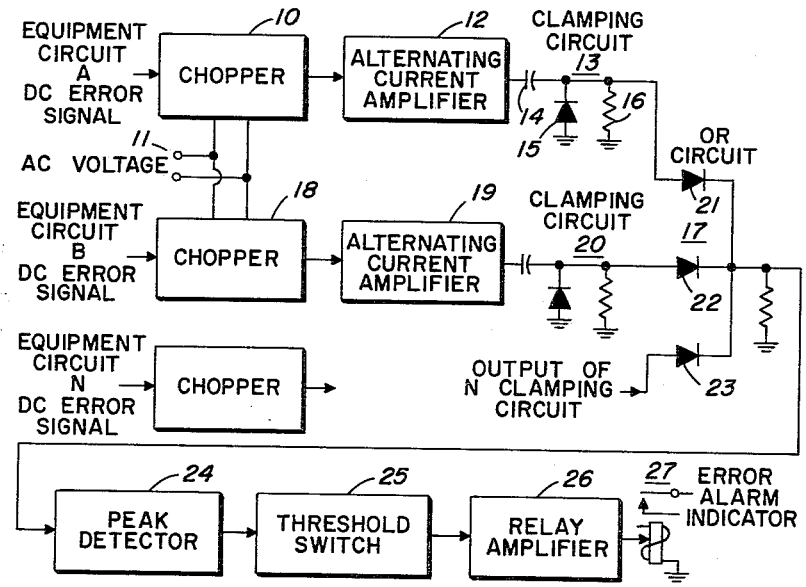
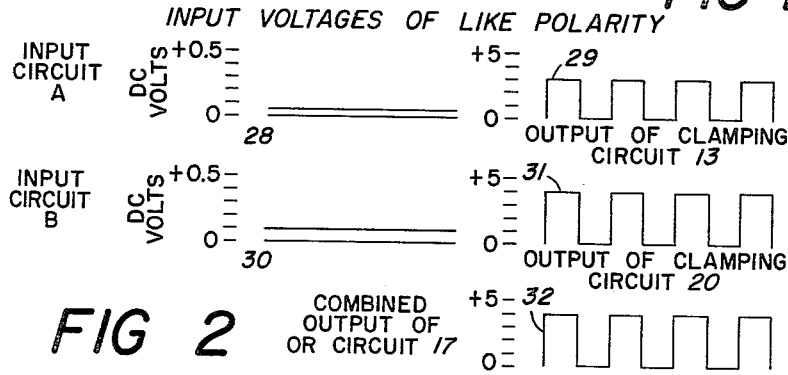
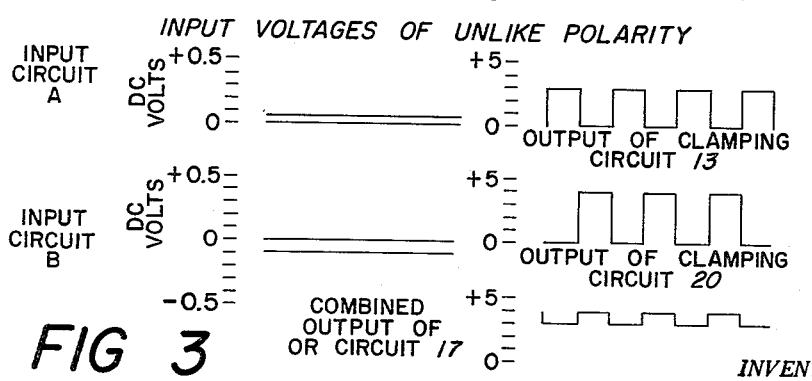
INVENTOR.
DONALD M. SYPTAK
BY Moody and Antrim
AGENTS

United States Patent Office 3,099,001
Patented July 23, 1963

3,099,001
VOLTAGE COMPARATOR THRESHOLD
ALARM CIRCUIT
Donald M. Syptak, Richardson, Tex., assignor to Collins Radio Company, Cedar Rapids, Iowa, a corporation of Iowa
Filed July 3, 1961, Ser. No. 121,725
1 Claim. (Cl. 340—248)

This invention pertains to monitoring circuits for detecting in a plurality of equipment circuits low-level direct-current voltages in excess of a predetermined value, and particularly to monitoring circuits having means for amplifying the monitored voltage and converting the voltage to a predetermined polarity with respect to a common reference, irrespective of the polarity of the applied input voltage, before application to a common threshold detector.

The monitoring or threshold circuits of this invention are applicable to monitor those equipments in which actuators or alarms are to be operated in response to departure of voltage in the circuits of the equipments from a low level of predetermined voltage. In a particular application to long-range electronic location equipment, the monitoring circuits operate to provide visual indication in response to the voltage in any one of several servo control circuits exceeding a predetermined voltage of very low level. The error voltages in the servo circuits are slowly varying direct-current voltages which might be either positive or negative. The voltages which are to be monitored cannot be applied effectively directly to diodes in OR circuits because the level of the voltages is either lower or comparable to the contact potentials of the diodes. In the present monitoring circuits the low-level direct-current voltages are chopped and amplified before application to an OR circuit. The OR circuit is then responsive to pass the amplified voltage which has the higher level. Since each individual circuit in which the excessive error voltage exists does not need to be identified, a single threshold circuit can be used to actuate an alarm. A clamping circuit is inserted between the amplifier and the OR circuit to relate the amplified voltages to a common base so that the voltages will be equally effective in being passed by the OR circuit regardless of the polarity of the input voltages from which the amplified voltages are derived.

An object of this invention is to utilize in a plurality of electronic equipment circuits a minimum number of monitoring circuits to detect direct-current voltage, irrespective of its polarity, above a predetermined level in any of the circuits being monitored.

Another object is to provide monitoring circuits that are positive in their operation over a wide range of ambient temperatures for detecting the increase of low-level voltages above a predetermined level.

The objects and the following description may be more readily understood with reference to the accompanying drawings in which:

FIG. 1 is a block diagram of the threshold alarm circuits of this invention; and FIGS. 2 and 3 show examples of the derivations from various direct-current input voltages of amplified voltages for operating a threshold circuit.

The circuit represented in FIG. 1 is typical of that used to monitor several servo circuits in a long-range distance location system. In the location system the readings of location are inaccurate when any of the several servo systems which are to be synchronized with the modulation of incoming signals have not fully completed their operation. The positions of the servo systems are properly synchronized when their respective control voltages which are being monitored are null. The input circuits A, B, and N of FIG. 1 are connected to different servo control systems for sensing low-level direct-current voltages when the servo systems are slightly off the positions which produce null voltage.

The monitoring or alarm system has separate input amplifying means for each of the circuits which are to be monitored. The outputs of these separate input circuits are all connected to a common OR circuit. Equipment circuit A which is being monitored is connected to the input of chopper 10 which interrupts applied direct-current error signal to provide a chopped or square wave output. The operating circuit of chopper 10 is connected to a source of alternating-current voltage 11 for driving the chopper at the frequency of the alternating-current voltage. The output of chopper 10 is connected through alternating-current amplifier 12 and clamping circuit 13 to an input of the OR circuit 17. The amplifier 12 amplifies the output of chopper 10 to a suitable level for effective operation of the diodes in clamping circuit 13 and in the OR circuit 17. Clamping circuit 13 comprises series capacitor 14 and shunt connected diode 15 and resistor 16. Since the diode 15 and resistor 16 both offer relatively high resistance to positive voltages applied from the output of amplifier 12, positive voltages are effectively coupled through capacitor 14 directly to the OR circuit 17. When the output of the amplifier 12 is negative, the impedance of shunt diode 15 is low so that the most negative portion of the output voltage or square wave is established at ground potential. Because of the charge that is maintained on capacitor 14 between cycles of applied voltage and the high impedance of resistor 16, the less negative portion of the voltages which is applied from the output of the amplifier 12 are positive relative to the common conductor or ground.

The identical input circuit for equipment circuit B comprises chopper 18, alternating-current amplifier 19, and clamping circuit 20 which has its output connected to a different input of the OR circuit 17. Likewise, other identical input circuits are connected between the equipment circuits which are being monitored and the OR circuit 17. The operating circuits of choppers 10 and 18 are connected to the same source of alternating-current voltage 11 so that the voltages applied from respective clamping circuits to the OR circuit 17 are in synchronism to provide waveforms shown in FIGS. 2 and 3.

The output of each clamping circuit is connected to an anode of one of the diodes 21—23 of OR circuit 17. Cathodes of all of the diodes are connected to a common circuit for applying voltage from any of the input circuits to a single threshold detector and switching circuit. Since the output voltages of all of the clamping circuits are positive relative to the reference ground potential, only that diode to which is applied the greater voltage is conductive.

The threshold detection circuit which is connected to the output of the OR circuit 17 comprises serially connected peak detector 224, threshold switch 25, and relay amplifier 26 to which is connected the alarm relay 27. The peak detector 24 rectifies and integrates the maximum error voltage that has been applied through the OR circuit 17, and therefore, provides a direct-current output voltage which is proportional to the level of the maximum direct-current error voltage for application to the inputs of the monitoring system. When the output of the peak detector exceeds a predetermined threshold voltage, the threshold switch 25 operates or triggers to provide an abrupt substantial change in voltage to relay amplifier 26. The threshold switch 25 may be a conventional bistable differential amplifier circuit such as that commonly known as a Schmitt trigger circuit. In response to the application of voltage above a predetermined voltage, the threshold switch 25 operates to one of its states and in response to the applied voltage falling below the predetermined voltage, operates to its other state. When the threshold switch 25 is operated in response to any of the input error voltages exceeding a predetermined voltage, the alarm relay 27 operates to provide a visual or audible indication that the error signal is present in the equipment that is being monitored.

When the derived voltages in only two input circuits are considered, the output voltage passed by the OR circuit 17 corresponds to that derived from the higher input voltage only, providing the applied input voltages have like polarity as illustrated in FIG. 2 and providing the choppers of the two circuits are operated in synchronism, but the output voltage is a combination derived from the two input voltages when the input voltages have unlike polarities as illustrated in FIG. 3. In FIG. 2 the voltage applied to the input of circuit A is a positive voltage less than .1 volt as represented by line 28. This small input voltage is chopped and amplified to provide a waveform having positive peak voltages 29 of 3 volts. The voltage to input circuit B as represented by line 30 is a positive voltage somewhat greater than the voltage applied to the input of circuit B so that when it is chopped and amplified a like amount, the peak positive voltages 31 at the output of the clamping circuit 20 is 4 volts. Since the choppers of monitoring circuits A and B are operated in phase, the peak voltages at the outputs of clamping circuits 13 and 20 coincide and the voltages return to ground voltage at the same time. The combined voltages applied from the OR circuit to the peak detector according to the waveform 32 coincide with the waveform of the greater voltage applied to clamping circuit 20, for the OR circuit passes only the higher voltage at any instant. When the input voltages have unlike polarities as illustrated in FIG. 3, the peak voltages of the two waveforms and the ground voltages occur at different times so that the peak voltages applied to the OR circuit 17 from clamping circuit 13 and clamping circuit 20 are passed alternately to the succeeding peak detector circuit. The voltage at the output of clamping circuit 20 as derived from the negative input voltage has had the negative peaks established at ground potential so that the voltages which originally had a potential corresponding to ground become the positive peak voltages. Regardless of whether or not the input voltages have like polarity or unlike polarity, the threshold switch 25 operates in response to the detection of peak voltage by detector 24 greater than a predetermined voltage.

A threshold alarm circuit according to the present invention operates consistently over a wide temperature range in response to the application of low-level direct-current voltages exceeding a predetermined voltage. Since the input resistance of each of the monitoring circuits is high, little power is required from the circuit that is being monitored. The detecting and threshold circuits have been reduced to a minimum. The number of threshold circuits required is dependent generally only upon the requirement for identifying the source of the error voltage.

Although this invention has been described with respect to a particular embodiment thereof, it is not to be so limited, as changes and modifications may be made therein which are within the spirit and scope of the invention as defined by the appended claim.

I claim:

A threshold alarm circuit responsive to low-level direct-current voltages irrespective of polarity from a plurality of input circuits comprising, a chopper, an alternating-current amplifier, and a clamping circuit connected respectively in series for each of said input circuits, said input circuits being connected to said respective choppers, means for operating said choppers in synchronism, each of said clamping circuits receiving the amplified output of the respective one of said choppers to establish the peaks of a predetermined polarity of the voltages applied to all of said clamping circuits at a common potential regardless of the polarities and amplitudes of the voltages applied to the inputs of said threshold alarm circuit, an OR circuit, the output of each of said clamping circuits being connected to a respective input of said OR circuit, said OR circuit having a diode for each of said input circuits, said diodes being conductive to pass voltage to the output of said OR circuit, any one of said diodes being conductive in response to the application of voltage greater than the peak voltage applied to any other of said diodes providing said peak voltage has polarity opposite from said predetermined polarity, and indicator means operative in response to the application of peak voltage from the output of said OR circuit exceeding a predetermined value.

References Cited in the file of this patent

UNITED STATES PATENTS

| | | |
|---|---|---|
| 2,600,172 | St. John | June 10, 1952 |
| 2,708,717 | Holmes et al. | May 17, 1955 |
| 2,943,303 | Barber | June 28, 1960 |